United States Patent
Purushothaman

(10) Patent No.: US 10,218,562 B2
(45) Date of Patent: Feb. 26, 2019

(54) PARSING AND OPTIMIZING RUNTIME INFRASTRUCTURE ALERTS

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 302 days.

(21) Appl. No.: 15/347,135

(22) Filed: Nov. 9, 2016

(65) Prior Publication Data

US 2018/0131563 A1    May 10, 2018

(51) Int. Cl.
*G06F 15/16* (2006.01)
*H04L 12/24* (2006.01)
*H04L 12/26* (2006.01)

(52) U.S. Cl.
CPC ...... *H04L 41/0681* (2013.01); *H04L 41/0604* (2013.01); *H04L 41/0631* (2013.01); *H04L 43/0817* (2013.01)

(58) Field of Classification Search
CPC ............. H04L 41/0681; H04L 41/0604; H04L 41/0631; H04L 43/0817
See application file for complete search history.

(56) References Cited

U.S. PATENT DOCUMENTS

| | | | |
|---|---|---|---|
| 8,015,137 B2 | 9/2011 | Allen et al. | |
| 8,250,637 B2 | 8/2012 | Allen et al. | |
| 9,009,307 B2 | 4/2015 | Jain et al. | |
| 9,176,807 B2 | 11/2015 | Singh et al. | |
| 9,219,639 B2 | 12/2015 | Jain et al. | |
| 2004/0204775 A1* | 10/2004 | Keyes | G05B 13/042 700/29 |
| 2014/0289745 A1* | 9/2014 | Nirantar | G06F 11/3013 719/318 |
| 2014/0342716 A1* | 11/2014 | Harris | H04W 8/22 455/418 |
| 2015/0261649 A1* | 9/2015 | Boehm | G06F 11/3466 714/47.3 |
| 2016/0277587 A1 | 9/2016 | Alexander et al. | |
| 2016/0283219 A1 | 9/2016 | Banford et al. | |

(Continued)

*Primary Examiner* — Hieu T Hoang
(74) *Attorney, Agent, or Firm* — Banner & Witcoff, Ltd.; Michael A. Springs

(57) ABSTRACT

Aspects of the disclosure relate to monitoring and managing computer networks by parsing and optimizing runtime infrastructure alerts. A computing platform may receive, from a server controller device associated with server infrastructure, alert information identifying a set of alerts associated with the server infrastructure. The computing platform may apply a pre-analyzer filter to the alert information to obtain a filtered set of alerts. Subsequently, the computing platform may identify alert trends and alert drifts associated with a set of applications hosted by the server infrastructure. The computing platform may generate a set of new alert rules based on the alert trends and the alert drifts, and may store updated configuration settings incorporating the set of new alert rules. Then, the computing platform may send, to an administrative computing device, a set of verified alerts based on the updated configuration settings incorporating the set of new alert rules.

20 Claims, 10 Drawing Sheets

(56) References Cited

U.S. PATENT DOCUMENTS

| | | |
|---|---|---|
| 2016/0283573 A1 | 9/2016 | Werner et al. |
| 2016/0285717 A1 | 9/2016 | Kim et al. |
| 2016/0286034 A1 | 9/2016 | Iyer et al. |
| 2016/0286394 A1 | 9/2016 | Iyer et al. |
| 2016/0286627 A1 | 9/2016 | Chen et al. |
| 2016/0286629 A1 | 9/2016 | Chen et al. |
| 2016/0291815 A1 | 10/2016 | Salles |
| 2016/0291921 A1 | 10/2016 | Miller et al. |
| 2016/0291940 A1 | 10/2016 | Searle et al. |
| 2016/0291959 A1 | 10/2016 | Searle et al. |
| 2016/0291993 A1 | 10/2016 | Prabhakar et al. |
| 2016/0292182 A1 | 10/2016 | Porpora et al. |
| 2016/0292611 A1 | 10/2016 | Boe et al. |
| 2016/0294605 A1 | 10/2016 | Searle et al. |
| 2016/0294606 A1 | 10/2016 | Puri et al. |
| 2016/0294614 A1 | 10/2016 | Searle et al. |
| 2016/0294633 A1 | 10/2016 | Dragon et al. |
| 2016/0294667 A1 | 10/2016 | Prabhakar et al. |
| 2016/0294762 A1 | 10/2016 | Miller |
| 2016/0294763 A1 | 10/2016 | Miller |
| 2016/0294780 A1 | 10/2016 | Prabhakar et al. |
| 2016/0294799 A1 | 10/2016 | Miller et al. |
| 2016/0294831 A1 | 10/2016 | Borunda et al. |
| 2016/0294890 A1 | 10/2016 | Miller |
| 2016/0294891 A1 | 10/2016 | Miller |
| 2016/0294894 A1 | 10/2016 | Miller |
| 2016/0294953 A1 | 10/2016 | Prabhakar et al. |
| 2016/0295551 A1 | 10/2016 | Vetter et al. |
| 2016/0295616 A1 | 10/2016 | Zakaria |
| 2016/0299778 A1 | 10/2016 | Barak et al. |
| 2016/0300001 A1 | 10/2016 | Drumm et al. |
| 2016/0300019 A1 | 10/2016 | Baluta |
| 2016/0300183 A1 | 10/2016 | Berger et al. |
| 2016/0301677 A1 | 10/2016 | Helms et al. |
| 2016/0301705 A1 | 10/2016 | Higbee et al. |
| 2016/0302698 A1 | 10/2016 | Perlman |
| 2016/0306718 A1 | 10/2016 | Greiner et al. |
| 2016/0306719 A1 | 10/2016 | Laicher et al. |
| 2016/0306966 A1 | 10/2016 | Srivastava et al. |
| 2016/0307433 A1 | 10/2016 | Hanggi |
| 2016/0308861 A1 | 10/2016 | Ameling et al. |
| 2016/0308982 A1 | 10/2016 | Greene |
| 2016/0321572 A9 | 11/2016 | Martinez et al. |
| 2016/0323139 A1 | 11/2016 | Cordray et al. |
| 2016/0323152 A1 | 11/2016 | Cordray et al. |
| 2016/0323153 A1 | 11/2016 | Cordray et al. |
| 2016/0323279 A1 | 11/2016 | Raleigh |
| 2016/0323303 A1 | 11/2016 | Thomas |
| 2017/0091867 A1* | 3/2017 | Trainor .................. G06Q 40/08 |
| 2017/0153962 A1* | 6/2017 | Biegun ............... G06F 11/3409 |
| 2018/0167407 A1* | 6/2018 | Ikeda ..................... G06F 17/30 |

* cited by examiner

PARSING AND OPTIMIZING RUNTIME INFRASTRUCTURE ALERTS

BACKGROUND

Aspects of the disclosure relate to electrical computers, digital processing systems, and multicomputer data transferring. In particular, one or more aspects of the disclosure relate to monitoring and managing computer networks by parsing and optimizing runtime infrastructure alerts.

Large computing environments may include many servers that host and/or otherwise support many different applications. As increasing numbers of servers are incorporated into a particular computing environment, some servers may experience technical issues that result in alerts being generated and/or other notifications being sent to administrators of the computing environment for resolution. In many instances, however, some alerts might only represent transient issues encountered by particular servers rather than genuine problems in the computing environment that require attention and/or action, and it may be difficult to distinguish and/or identify the alerts that are indicative of genuine problems in the computing environment that require such attention and/or action.

SUMMARY

Aspects of the disclosure provide effective, efficient, scalable, and convenient technical solutions that address and overcome the technical problems associated with monitoring and managing computer networks. In particular, one or more aspects of the disclosure provide techniques for monitoring and managing computer networks by parsing and optimizing runtime infrastructure alerts.

In accordance with one or more embodiments, a computing platform having at least one processor, a memory, and a communication interface may receive, via the communication interface, from a server controller device associated with server infrastructure, first alert information identifying a first set of alerts associated with the server infrastructure. Subsequently, the computing platform may apply a pre-analyzer filter to the first alert information identifying the first set of alerts associated with the server infrastructure to obtain a first filtered set of alerts associated with the server infrastructure. Thereafter, the computing platform may identify first alert trends associated with the server infrastructure based on the first filtered set of alerts associated with the server infrastructure. Then, the computing platform may identify first alert drifts associated with a first set of applications hosted by the server infrastructure based on the first filtered set of alerts associated with the server infrastructure. Subsequently, the computing platform may generate a first set of new alert rules based on the first alert trends associated with the server infrastructure and the first alert drifts associated with the first set of applications hosted by the server infrastructure. Next, the computing platform may store first updated configuration settings incorporating the first set of new alert rules generated based on the first alert trends associated with the server infrastructure and the first alert drifts associated with the first set of applications hosted by the server infrastructure. Then, the computing platform may send, via the communication interface, to an administrative computing device, a first set of verified alerts based on the first updated configuration settings incorporating the first set of new alert rules.

In some embodiments, prior to receiving the first alert information identifying the first set of alerts associated with the server infrastructure, the computing platform may receive, via the communication interface, from the administrative computing device, one or more baseline configuration commands. Subsequently, the computing platform may store configuration information based on receiving the one or more baseline configuration commands from the administrative computing device.

In some embodiments, the first alert information identifying the first set of alerts associated with the server infrastructure may be aggregated by an aggregation layer provided by the server controller device associated with the server infrastructure.

In some embodiments, one or more alerts included in the first set of alerts associated with the server infrastructure may be generated by one or more servers included in the server infrastructure based on one or more detected deviations from one or more baseline conditions.

In some embodiments, identifying the first alert trends associated with the server infrastructure based on the first filtered set of alerts associated with the server infrastructure may include classifying one or more alerts included in the first filtered set of alerts associated with the server infrastructure as genuine alerts or non-genuine alerts based on one or more classification parameters.

In some embodiments, identifying the first alert drifts associated with the first set of applications hosted by the server infrastructure based on the first filtered set of alerts associated with the server infrastructure may include identifying at least one alert drift that is specific to a particular application included in the first set of applications hosted by the server infrastructure.

In some embodiments, generating the first set of new alert rules based on the first alert trends associated with the server infrastructure and the first alert drifts associated with the first set of applications hosted by the server infrastructure may include generating at least one new alert defined as a logical statement.

In some embodiments, storing the first updated configuration settings incorporating the first set of new alert rules generated based on the first alert trends associated with the server infrastructure and the first alert drifts associated with the first set of applications hosted by the server infrastructure may include modifying one or more baseline configuration settings used by the pre-analyzer filter.

In some embodiments, the computing platform may update alert status information maintained in an alert optimization database based on the first updated configuration settings incorporating the first set of new alert rules.

In some embodiments, the computing platform may receive, via the communication interface, from the server controller device associated with the server infrastructure, second alert information identifying a second set of alerts associated with the server infrastructure. Subsequently, the computing platform may apply the pre-analyzer filter to the second alert information identifying the second set of alerts associated with the server infrastructure to obtain a second filtered set of alerts associated with the server infrastructure. Thereafter, the computing platform may identify second alert trends associated with the server infrastructure based on the second filtered set of alerts associated with the server infrastructure. Then, the computing platform may identify second alert drifts associated with a second set of applications hosted by the server infrastructure based on the second filtered set of alerts associated with the server infrastructure. Subsequently, the computing platform may generate a second set of new alert rules based on the second alert trends associated with the server infrastructure and the second alert drifts associated with the second set of applications hosted by the server infrastructure. Next, the computing platform may store second updated configuration settings incorporating the second set of new alert rules generated based on the second alert trends associated with the server infrastructure and the second alert drifts associated with the second set of applications hosted by the server infrastructure. Then, the computing platform may send, via the communication interface, to the administrative computing device, a second set of verified alerts based on the second updated configuration settings incorporating the second set of new alert rules.

In some embodiments, the second alert information identifying the second set of alerts associated with the server infrastructure may be aggregated by an aggregation layer provided by the server controller device associated with the server infrastructure.

In some embodiments, one or more alerts included in the second set of alerts associated with the server infrastructure may be generated by one or more servers included in the server infrastructure based on one or more detected deviations from one or more baseline conditions.

In some embodiments, identifying the second alert trends associated with the server infrastructure based on the second filtered set of alerts associated with the server infrastructure may include classifying one or more alerts included in the second filtered set of alerts associated with the server infrastructure as genuine alerts or non-genuine alerts based on one or more classification parameters.

In some embodiments, identifying the second alert drifts associated with the second set of applications hosted by the server infrastructure based on the second filtered set of alerts associated with the server infrastructure may include identifying at least one alert drift that is specific to a particular application included in the second set of applications hosted by the server infrastructure.

In some embodiments, generating the second set of new alert rules based on the second alert trends associated with the server infrastructure and the second alert drifts associated with the second set of applications hosted by the server infrastructure may include generating at least one new alert defined as a logical statement.

In some embodiments, storing the second updated configuration settings incorporating the second set of new alert rules generated based on the second alert trends associated with the server infrastructure and the second alert drifts associated with the second set of applications hosted by the server infrastructure may include modifying one or more baseline configuration settings used by the pre-analyzer filter.

In some embodiments, the computing platform may update alert status information maintained in an alert optimization database based on the second updated configuration settings incorporating the second set of new alert rules.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to reducing alerts in an infrastructure environment, which may be challenging because of dynamic changes in the environment that occur on a routine basis. Environments with logic resolution workflows may help to address sets of issues and keep a particular environment at an optimally configured level. However, it may be a challenge to characterize and identify a particular workflow as a static model for further configurations. In accordance with some aspects of the disclosure, a set of optimal specifications may be inferred from a dynamic analysis of outputs, observations, and/or records. Using information associated with a typical execution archetype of resolution techniques, a learned workflow may be filtered to optimally configure system parameters, reduce false positives, and/or model symbolic input to identify refined set point paths that are likely to represent ideal system conditions. To deal with variants, original rule sets may be identified from derived rule sets based on delta improvements. To systematically analyze a logic sequence of workflows, a system implementing one or more aspects of the disclosure may model all possible downstream interactions with systems and/or applications. In addition, the system may map all entry points to the system, various applications, and/or possible trails of execution, which may be validated and/or identified with the most optimal entry points.

Figure 1A:
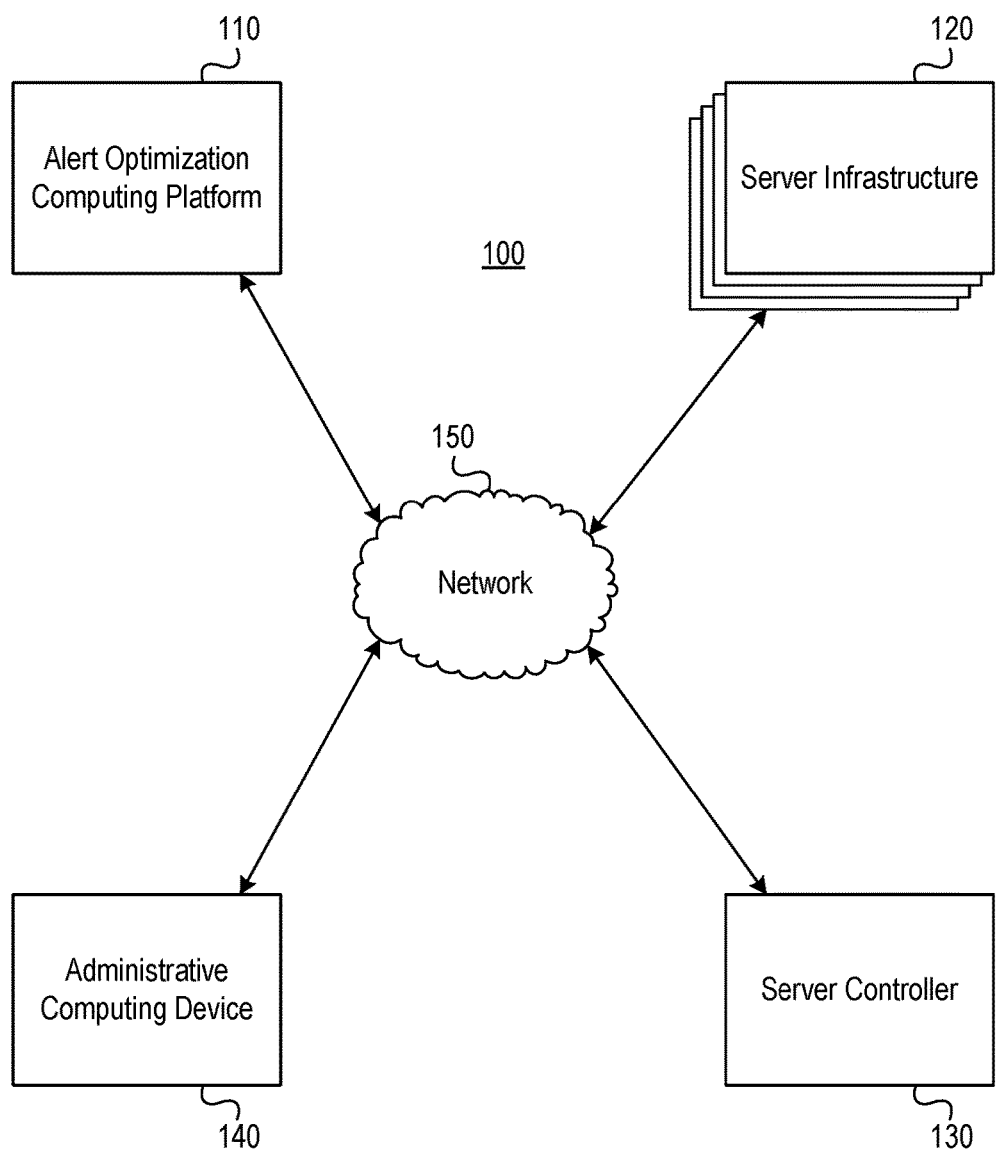
FIGS. 1A, 1B, and 1C depict an illustrative computing environment for monitoring and managing computer networks by parsing and optimizing runtime infrastructure alerts in accordance with one or more example embodiments.
Figure 1B:
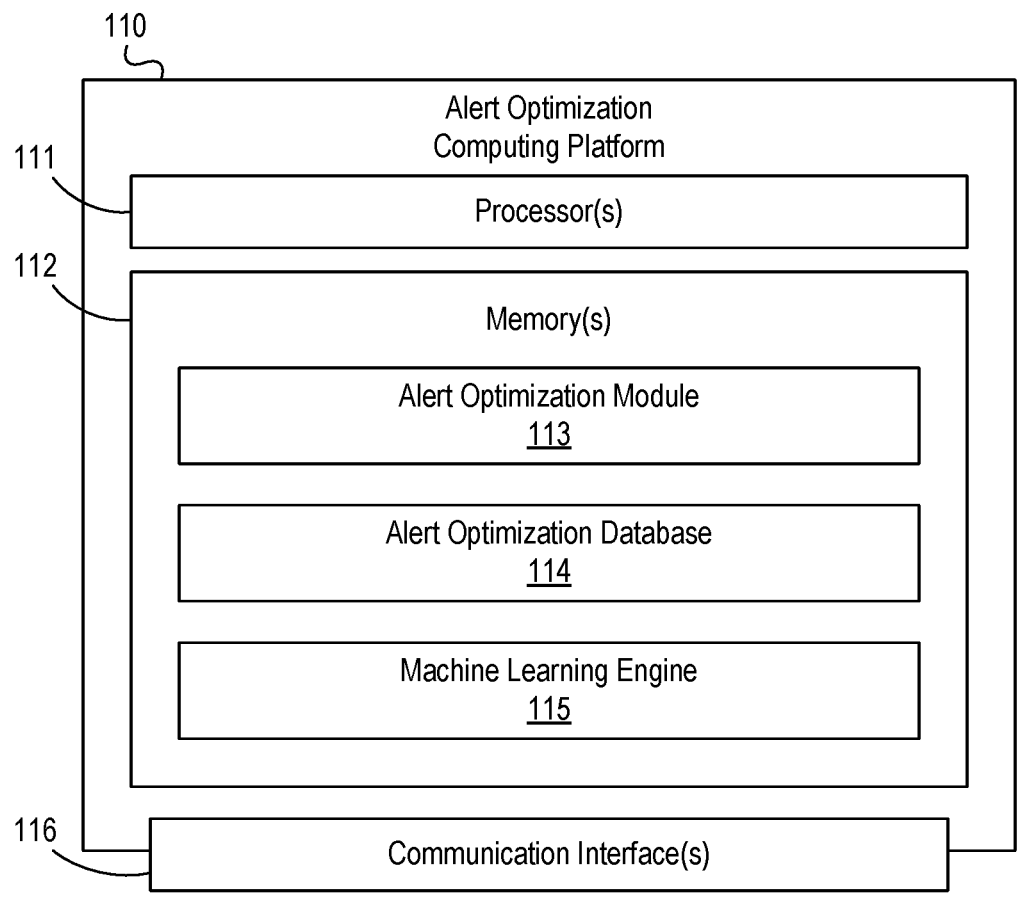
Figure 1C:
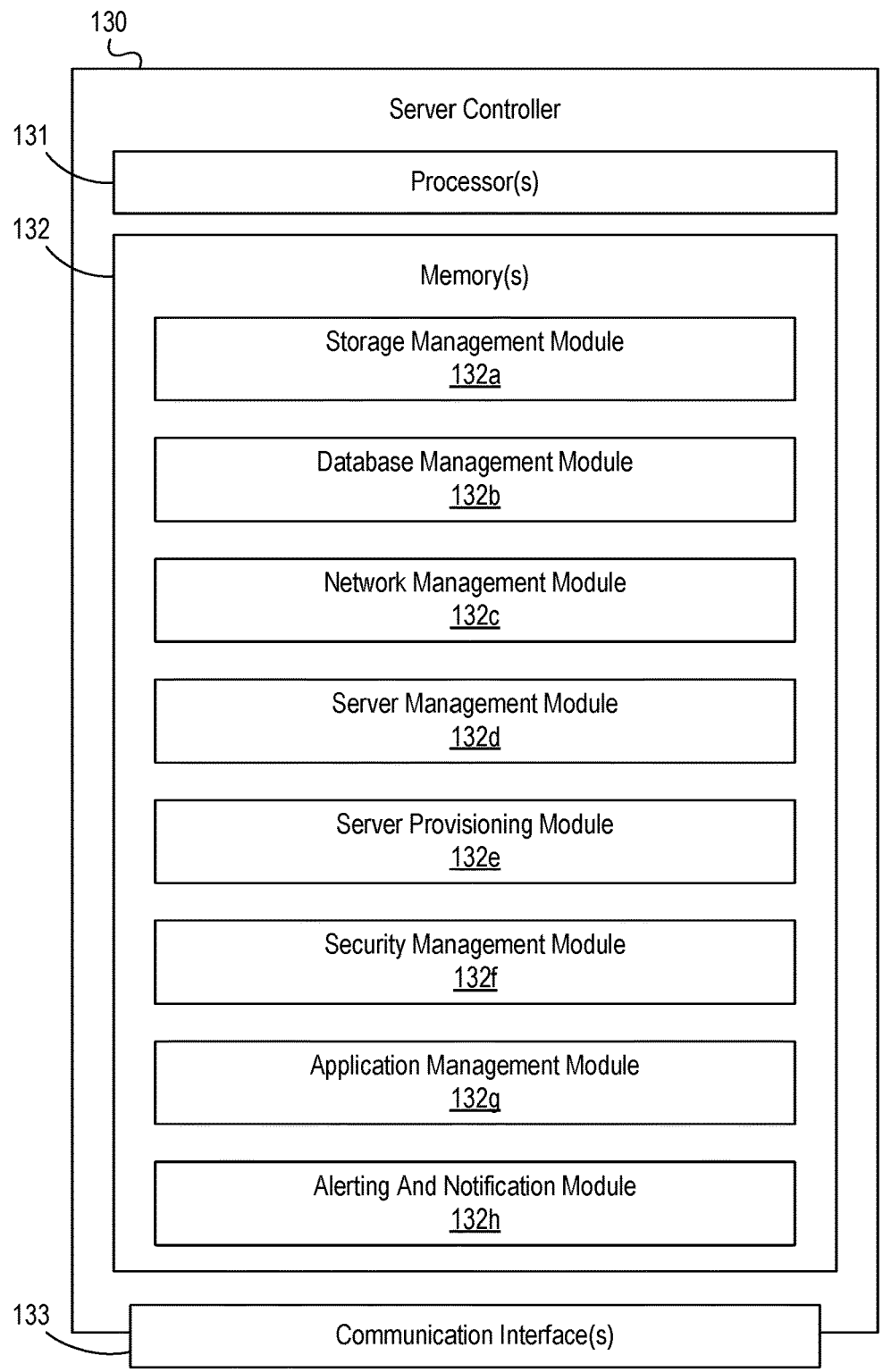

FIGS. 1A, 1B, and 1C depict an illustrative computing environment for monitoring and managing computer networks by parsing and optimizing runtime infrastructure alerts in accordance with one or more example embodiments. Referring to FIG. 1A, computing environment 100 may include one or more computing devices and/or other computer systems. For example, computing environment 100 may include an alert optimization computing platform 110, server infrastructure 120, a server controller 130, and an administrative computing device 140.

Alert optimization computing platform 110 may be configured to monitor and/or manage one or more computer networks and/or various systems included in such networks, parse and/or optimize various alerts, control and/or direct actions of other devices and/or computer systems, and/or perform other functions, as discussed in greater detail below. Server infrastructure 120 may include a plurality of computer servers and associated server hardware that may host various applications. In some arrangements, server infrastructure 120 may include and/or make up enterprise information technology infrastructure and may host a plurality of enterprise applications, enterprise databases, and/or other enterprise resources. Such applications may, for instance, be executed on one or more servers included in server infrastructure 120 using distributed computing technology and/or the like. In some instances, server infrastructure 120 may include a relatively large number of servers (e.g., 30,000 or more servers) that may support operations of a particular enterprise or organization, such as a financial institution. In addition, and as discussed in greater detail below, various servers included in server infrastructure 120 may generate alerts (e.g., when errors and/or other particular conditions are encountered), and server infrastructure 120 may send such alerts to other devices in computing environment 100, such as alert optimization computing platform 110 and/or server controller 130, for further analysis and/or other processing.

Server controller 130 may be configured to control and/or direct operations of one or more servers included in server infrastructure 120. For example, server controller 130 may be deployed at a data center where server infrastructure 120 is also deployed, and server controller 130 may provide one or more interfaces that allow other systems (e.g., alert optimization computing platform 110, administrative computing device 140) and/or other users to interact with and/or control particular servers included in server infrastructure 120. In some instances, server controller 130 may receive and/or aggregate alerts received from various servers included in server infrastructure 120, send alerts to alert optimization computing platform 110, receive commands from alert optimization computing platform 110, execute commands received from alert optimization computing platform 110, and/or perform other functions.

Administrative computing device 140 may be configured to be used by an administrative user in computing environment 100, such as a network administrator. For example, administrative computing device 140 may receive alerts and/or other information from alert optimization computing platform 110, server infrastructure 120, server controller 130, and/or other systems, display the alerts and/or other information received from alert optimization computing platform 110, server infrastructure 120, server controller 130, and/or other systems, execute actions based on user input, and/or perform other functions.

In one or more arrangements, server controller 130, administrative computing device 140, and the servers included in server infrastructure 120 may be any type of computing device capable of receiving a user interface, receiving input via the user interface, and communicating the received input to one or more other computing devices. For example, server controller 130, administrative computing device 140, and the servers included in server infrastructure 120 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of server controller 130, administrative computing device 140, and the servers included in server infrastructure 120 may, in some instances, be special-purpose computing devices configured to perform specific functions.

Computing environment 100 also may include one or more computing platforms. For example, and as noted above, computing environment 100 may include alert optimization computing platform 110. As illustrated in greater detail below, alert optimization computing platform 110 may include one or more computing devices configured to perform one or more of the functions described herein. For example, alert optimization computing platform 110 may include one or more computers (e.g., laptop computers, desktop computers, servers, server blades, or the like).

Computing environment 100 also may include one or more networks, which may interconnect one or more of alert optimization computing platform 110, server infrastructure 120, server controller 130, and administrative computing device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, alert optimization computing platform 110, server infrastructure 120, server controller 130, and administrative computing device 140 may be associated with an organization, and a private sub-network included in network 150 and associated with and/or operated by the organization may include one or more networks (e.g., LANs, WANs, virtual private networks (VPNs), or the like) that interconnect alert optimization computing platform 110, server infrastructure 120, server controller 130, and administrative computing device 140. Network 150 also may include a public sub-network that may connect the private sub-network and/or one or more computing devices connected thereto (e.g., alert optimization computing platform 110, server infrastructure 120, server controller 130, and administrative computing device 140) with one or more networks and/or computing devices that are not associated with the organization.

Referring to FIG. 1B, alert optimization computing platform 110 may include one or more processors 111, memory 112, and communication interface 116. A data bus may interconnect processor(s) 111, memory 112, and communication interface 116. Communication interface 116 may be a network interface configured to support communication between alert optimization computing platform 110 and one or more networks (e.g., network 150). Memory 112 may include one or more program modules having instructions that when executed by processor(s) 111 cause alert optimization computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of alert optimization computing platform 110 and/or by different computing devices that may form and/or otherwise make up alert optimization computing platform 110. For example, memory 112 may have, store, and/or include an alert optimization module 113, an alert optimization database 114, and a machine learning engine 115. Alert optimization module 113 may have instructions that direct and/or cause alert optimization computing platform 110 to parse and/or optimize runtime infrastructure alerts and/or perform other functions, as discussed in greater detail below. Alert optimization database 114 may store information used by alert optimization module 113 and/or alert optimization computing platform 110 in parsing and/or optimizing runtime infrastructure alerts and/or in performing other functions. Machine learning engine 115 may have instructions that direct and/or cause alert optimization computing platform 110 set, define, and/or iteratively redefine alert rules and/or other parameters used by alert optimization computing platform 110 and/or other systems in computing environment 100 in parsing and/or optimizing runtime infrastructure alerts on a continuous and/or real-time basis.

Referring to FIG. 1C, server controller 130 may include one or more processors 131, memory 132, and communication interface 133. Communication interface 133 may be a network interface configured to support communication between server controller 130 and one or more networks (e.g., network 150). Memory 132 may include one or more program modules having instructions that when executed by processor(s) 131 cause server controller 130 to monitor and/or manage one or more servers included in server infrastructure 120 and/or perform one or more other functions described herein. For example, memory 132 may have, store, and/or include a storage management module 132a, a database management module 132b, a network management module 132c, a server management module 132d, a server provisioning module 132e, a security management module 132f, an application management module 132g, and an alerting and notification module 132h.

Figure 2A:
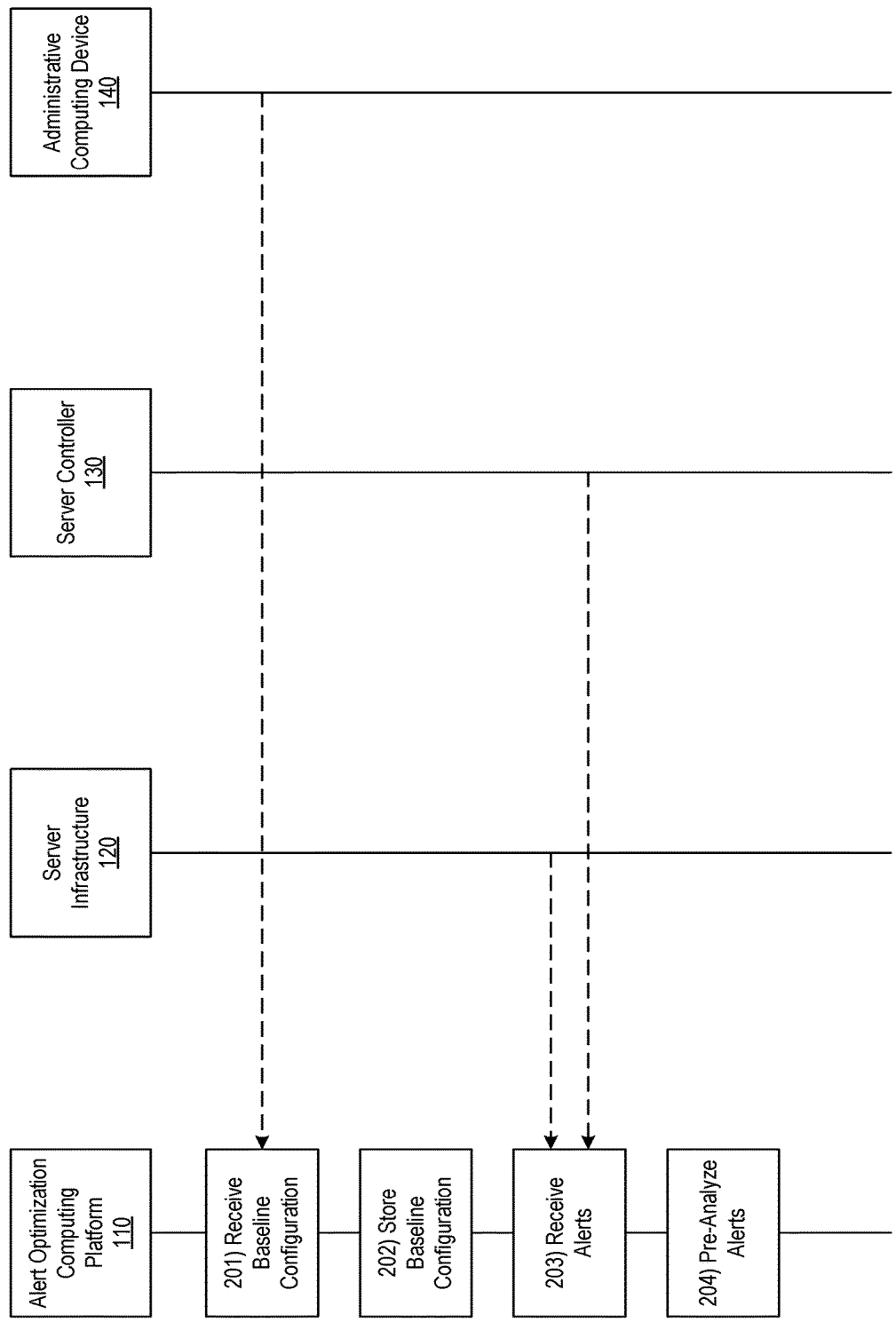
FIGS. 2A, 2B, 2C, 2D, and 2E depict an illustrative event sequence for monitoring and managing computer networks by parsing and optimizing runtime infrastructure alerts in accordance with one or more example embodiments.

FIGS. 2A, 2B, 2C, 2D, and 2E depict an illustrative event sequence for monitoring and managing computer networks by parsing and optimizing runtime infrastructure alerts in accordance with one or more example embodiments. Referring to FIG. 2A, at step 201, alert optimization computing platform 110 may receive a baseline configuration from administrative computing device 140. For example, at step 201, alert optimization computing platform 110 may receive, via the communication interface (e.g., communication interface 116), from the administrative computing device (e.g., administrative computing device 140), one or more baseline configuration commands. The one or more baseline configuration commands may, for instance, define one or more thresholds, settings, and/or other configuration parameters that may be used by alert optimization computing platform 110 in parsing and/or optimizing runtime infrastructure alerts, such as alerts that may be received by alert optimization computing platform 110 from server infrastructure 120 and/or server controller 130, as illustrated in greater detail below. In addition, such thresholds, settings, and/or other configuration parameters may be iteratively and/or dynamically adjusted on a continuous and/or real-time basis by alert optimization computing platform 110 (e.g., using machine learning engine 115) based on performance metrics and/or other information collected and/or analyzed by alert optimization computing platform 110.

Figure 3:
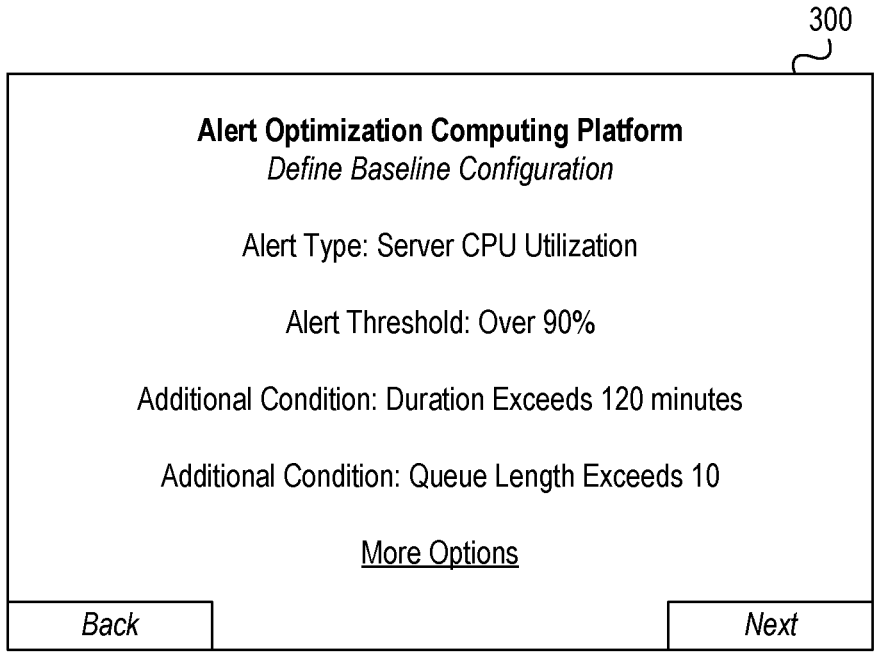
FIGS. 3 and 4 depict example graphical user interfaces for monitoring and managing computer networks by parsing and optimizing runtime infrastructure alerts in accordance with one or more example embodiments.

In some instances, the one or more baseline configuration commands received by alert optimization computing platform 110 from administrative computing device 140 may be defined by a user of administrative computing device 140 via a user interface presented by administrative computing device 140. The user interface presented by administrative computing device 140 may, in some instances, be generated by alert optimization computing platform 110 and sent by alert optimization computing platform 110 to administrative computing device 140 and/or otherwise provided by alert optimization computing platform 110 to administrative computing device 140. In sending such a user interface to administrative computing device 140, alert optimization computing platform 110 may cause administrative computing device 140 to display and/or otherwise present a graphical user interface similar to graphical user interface 300, which is illustrated in FIG. 3. As seen in FIG. 3, graphical user interface 300 may include one or more fields, controls, and/or other elements that may allow a user of administrative computing device 140 to define one or more baseline configuration settings for one or more alerts that may be triggered by one or more servers included in server infrastructure 120. For example, graphical user interface 300 may include one or more fields, controls, and/or other elements that may allow a user of administrative computing device 140 to define a new alert having an alert type parameter, an alert threshold parameter, a first additional condition parameter, and a second additional condition parameter. In addition, graphical user interface 300 may include one or more user interface elements that, when invoked by a user of administrative computing device 140, direct and/or cause administrative computing device 140 to generate and send the one or more baseline configuration commands to alert optimization computing platform 110.

At step 202, alert optimization computing platform 110 may store the baseline configuration received from administrative computing device 140. For example, at step 202, alert optimization computing platform 110 may store configuration information based on receiving the one or more baseline configuration commands from the administrative computing device (e.g., administrative computing device 140). In storing the configuration information based on receiving the one or more baseline configuration commands from administrative computing device 140, alert optimization computing platform 110 may, for instance, store configuration information defining one or more baseline filtering rules that may be used by a pre-analyzer filter provided by alert optimization computing platform 110 and/or other rules (which may, e.g., be generated by alert optimization computing platform 110 based on the one or more baseline configuration commands from administrative computing device 140).

At step 203, alert optimization computing platform 110 may receive one or more infrastructure alerts from server infrastructure 120 and/or server controller 130. For example, at step 203, alert optimization computing platform 110 may receive, via the communication interface (e.g., communication interface 116), from a server controller device (e.g., server controller 130) associated with server infrastructure (e.g., server infrastructure 120), first alert information identifying a first set of alerts associated with the server infrastructure (e.g., server infrastructure 120). For example, the first alert information identifying a first set of alerts associated with server infrastructure 120 may be received by alert optimization computing platform 110 from server controller 130, which may receive and/or gather alerts and/or other operational status information from server infrastructure 120, generate one or more alerts and/or additional alerts based on the alerts and/or other operational status information gathered from server infrastructure 120, and subsequently send the alert information identifying the gathered and/or generated alerts to alert optimization computing platform 110.

In some embodiments, the first alert information identifying the first set of alerts associated with the server infrastructure may be aggregated by an aggregation layer provided by the server controller device associated with the server infrastructure. For example, the first alert information (which may, e.g., be received by alert optimization computing platform 110 from server controller 130) identifying the first set of alerts associated with the server infrastructure (e.g., server infrastructure 120) may be aggregated by an aggregation layer provided by the server controller device (e.g., server controller 130) associated with the server infrastructure (e.g., server infrastructure 120). For example, server controller 130 may store and/or execute instructions (e.g., in one or more of storage management module 132*a*, database management module 132*b*, network management module 132*c*, server management module 132*d*, server provisioning module 132*e*, security management module 132*f*, application management module 132*g*, and alerting and notification module 132*h*) that cause server controller 130 to provide an aggregation layer that receives, collects, and/or aggregates alerts and/or other operational status information from the servers included in server infrastructure 120.

In some embodiments, one or more alerts included in the first set of alerts associated with the server infrastructure may be generated by one or more servers included in the server infrastructure based on one or more detected deviations from one or more baseline conditions. For example, one or more alerts included in the first set of alerts associated with the server infrastructure (e.g., server infrastructure 120) may be generated by one or more servers included in the server infrastructure (e.g., server infrastructure 120) based on one or more detected deviations from one or more baseline conditions. Such deviations may be detected based on monitored conditions and/or measured parameters exceeding one or more thresholds that may be defined by logical statements, conditional statements, parameter ranges, and/or the like. In some instances, one or more alerts included in the first set of alerts associated with the server infrastructure (e.g., server infrastructure 120) may, for instance, be generated based on detected deviations from one or more thresholds that are defined by and/or otherwise associated with the baseline configuration defined by and/or received from administrative computing device 140.

At step 204, alert optimization computing platform 110 may pre-analyze the one or more infrastructure alerts received from server infrastructure 120 and/or server controller 130. For example, at step 204, alert optimization computing platform 110 may apply a pre-analyzer filter to the first alert information identifying the first set of alerts associated with the server infrastructure (e.g., server infrastructure 120) to obtain a first filtered set of alerts associated with the server infrastructure (e.g., server infrastructure 120). In applying the pre-analyzer filter to the first alert information identifying the first set of alerts associated with server infrastructure 120, alert optimization computing platform 110 may, for instance, filter the first set of alerts associated with server infrastructure 120 based on the baseline configuration received from administrative computing device 140 to obtain the first filtered set of alerts associated with server infrastructure 120.

Figure 2B:
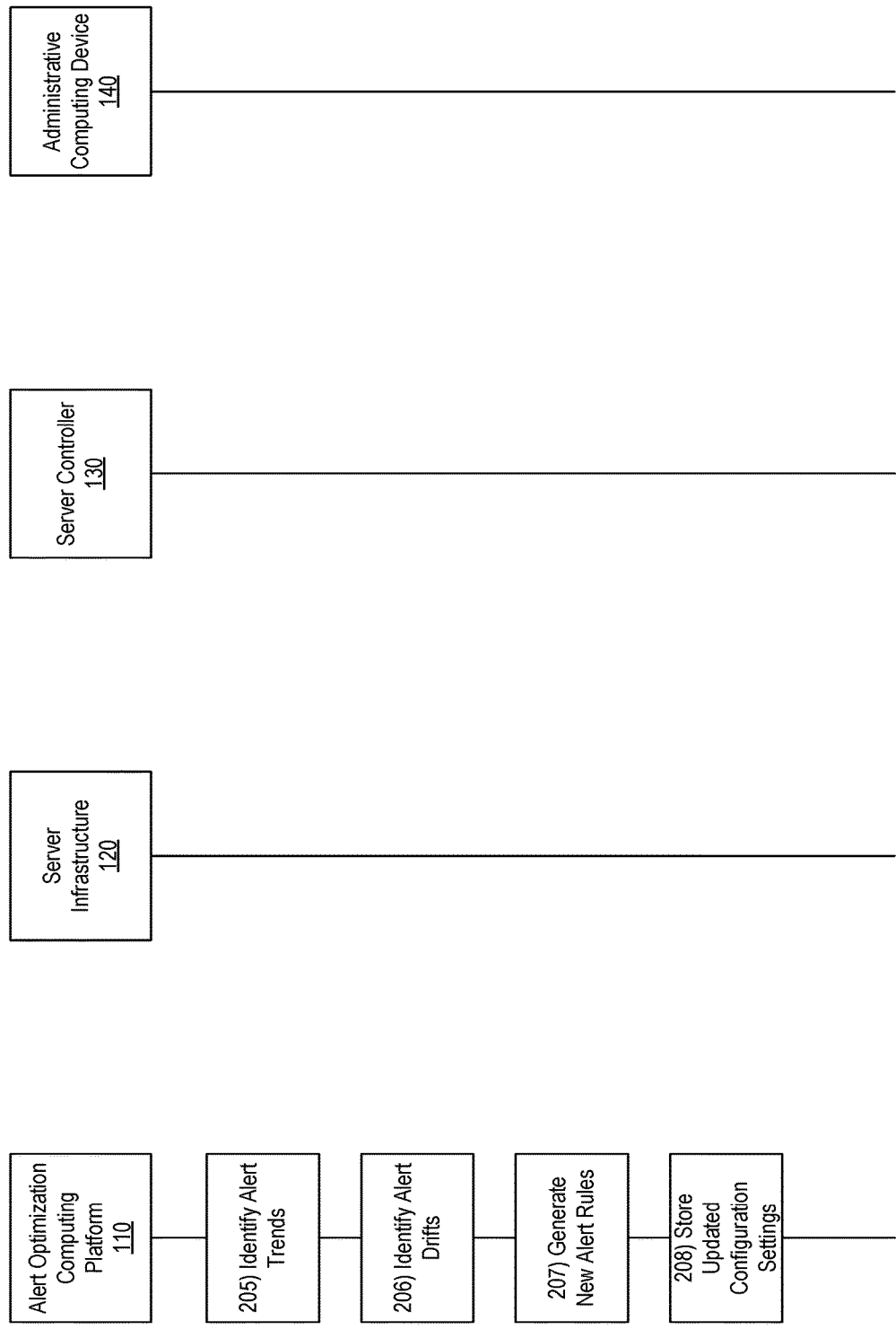

Referring to FIG. 2B, at step 205, alert optimization computing platform 110 may identify trends in the one or more infrastructure alerts received from server infrastructure 120 and/or server controller 130. For example, at step 205, alert optimization computing platform 110 may identify first alert trends associated with the server infrastructure (e.g., server infrastructure 120) based on the first filtered set of alerts associated with the server infrastructure (e.g., server infrastructure 120). In some embodiments, identifying the first alert trends associated with the server infrastructure based on the first filtered set of alerts associated with the server infrastructure may include classifying one or more alerts included in the first filtered set of alerts associated with the server infrastructure as genuine alerts or non-genuine alerts based on one or more classification parameters. For example, in identifying the first alert trends associated with the server infrastructure (e.g., server infrastructure 120) based on the first filtered set of alerts associated with the server infrastructure (e.g., server infrastructure 120), alert optimization computing platform 110 may classify one or more alerts included in the first filtered set of alerts associated with the server infrastructure (e.g., server infrastructure 120) as genuine alerts or non-genuine alerts based on one or more classification parameters. In some instances, the one or more classification parameters (which may, e.g., be used by alert optimization computing platform 110 in classifying alerts as genuine alerts or non-genuine alerts may be defined by and/or generated by alert optimization computing platform 110 based on the baseline configuration received from administrative computing device 140.

At step 206, alert optimization computing platform 110 may identify drifts in the one or more infrastructure alerts received from server infrastructure 120 and/or server controller 130. For example, at step 206, alert optimization computing platform 110 may identify first alert drifts associated with a first set of applications hosted by the server infrastructure (e.g., server infrastructure 120) based on the first filtered set of alerts associated with the server infrastructure (e.g., server infrastructure 120). Such drifts may, for example, represent and/or correspond to groups or packets of alerts that are common across particular applications and/or the underlying environment and that might not be classifiable (e.g., when identifying alert trends, as discussed above) but might nevertheless be indicative of a unique pattern.

In some embodiments, identifying the first alert drifts associated with the first set of applications hosted by the server infrastructure based on the first filtered set of alerts associated with the server infrastructure may include identifying at least one alert drift that is specific to a particular application included in the first set of applications hosted by the server infrastructure. For example, in identifying the first alert drifts associated with the first set of applications hosted by the server infrastructure (e.g., server infrastructure 120) based on the first filtered set of alerts associated with the server infrastructure (e.g., server infrastructure 120), alert optimization computing platform 110 may identify at least one alert drift that is specific to a particular application included in the first set of applications hosted by the server infrastructure (e.g., server infrastructure 120).

At step 207, alert optimization computing platform 110 may generate new alert rules (e.g., based on the alert trends and/or the alert drifts). For example, at step 207, alert optimization computing platform 110 may generate a first set of new alert rules based on the first alert trends associated with the server infrastructure (e.g., server infrastructure 120) and the first alert drifts associated with the first set of applications hosted by the server infrastructure (e.g., server infrastructure 120).

In some embodiments, generating the first set of new alert rules based on the first alert trends associated with the server infrastructure and the first alert drifts associated with the first set of applications hosted by the server infrastructure may include generating at least one new alert defined as a logical statement. For example, in generating the first set of new alert rules based on the first alert trends associated with the server infrastructure (e.g., server infrastructure 120) and the first alert drifts associated with the first set of applications hosted by the server infrastructure (e.g., server infrastructure 120), alert optimization computing platform 110 may generate at least one new alert defined as a logical statement. In some instances, the logical statement may include a boolean equation that can be evaluated by alert optimization computing platform 110 based on conditions in server infrastructure 120 being monitored by alert optimization computing platform 110.

At step 208, alert optimization computing platform 110 may store updated configuration settings (e.g., based on the new alert rules generated by alert optimization computing platform 110). For example, at step 208, alert optimization computing platform 110 may store first updated configuration settings incorporating the first set of new alert rules generated (e.g., by alert optimization computing platform 110) based on the first alert trends associated with the server infrastructure (e.g., server infrastructure 120) and the first alert drifts associated with the first set of applications hosted by the server infrastructure (e.g., server infrastructure 120).

In some embodiments, storing the first updated configuration settings incorporating the first set of new alert rules generated based on the first alert trends associated with the server infrastructure and the first alert drifts associated with the first set of applications hosted by the server infrastructure may include modifying one or more baseline configuration settings used by the pre-analyzer filter. For example, in storing the first updated configuration settings incorporating the first set of new alert rules generated based on the first alert trends associated with the server infrastructure (e.g., server infrastructure 120) and the first alert drifts associated with the first set of applications hosted by the server infrastructure (e.g., server infrastructure 120), alert optimization computing platform 110 may modify one or more baseline configuration settings used by the pre-analyzer filter. For instance, alert optimization computing platform 110 may modify one or more baseline configuration settings used by the pre-analyzer filter to control and/or otherwise cause the pre-analyzer filter to apply and/or otherwise use the new alert rules generated by alert optimization computing platform 110 when filtering and/or otherwise processing subsequent alerts in the future.

Figure 2C:
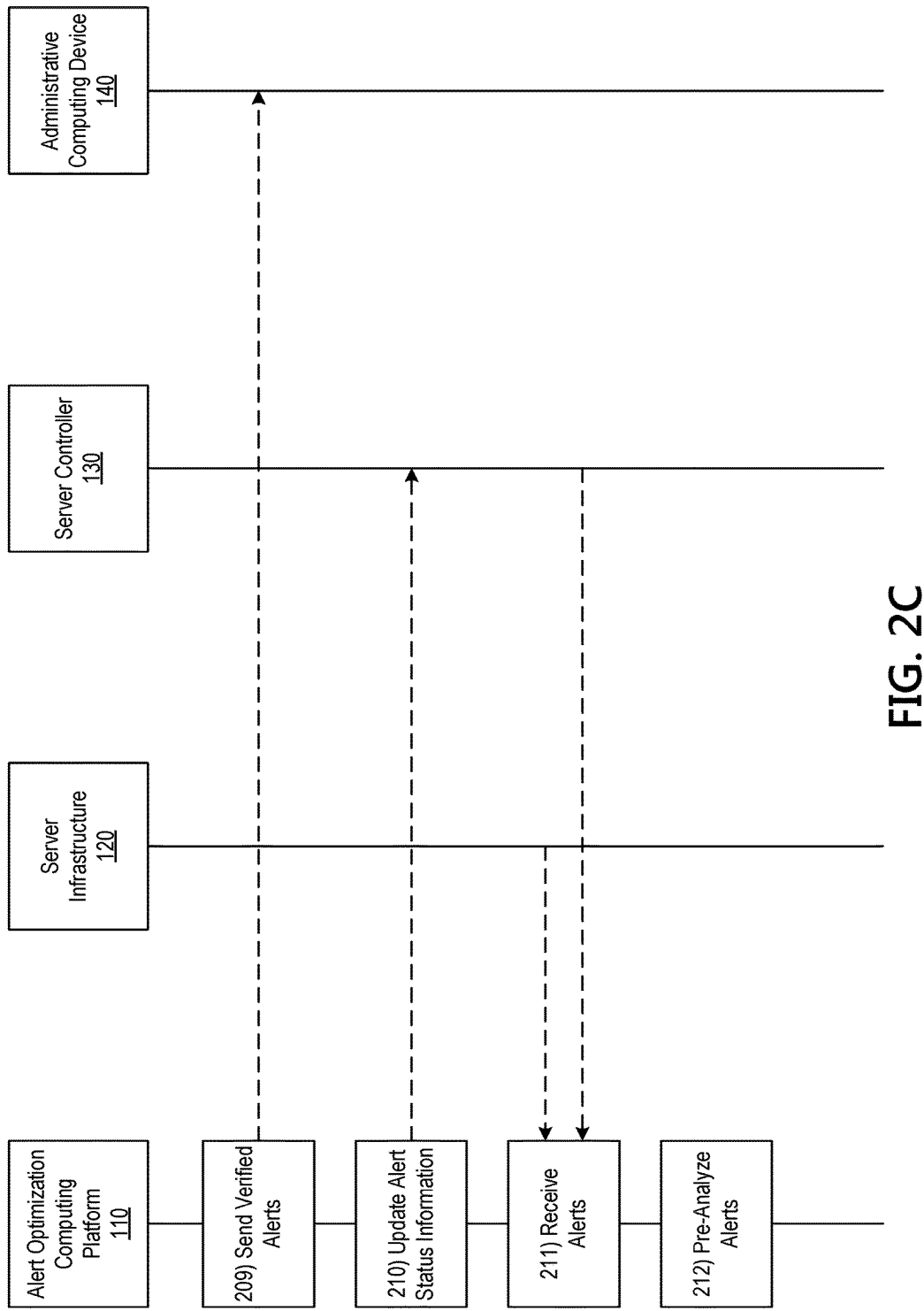

Referring to FIG. 2C, at step 209, alert optimization computing platform 110 may send one or more verified alerts to administrative computing device 140. For example, at step 209, alert optimization computing platform 110 may send, via the communication interface (e.g., communication interface 116), to an administrative computing device (e.g., administrative computing device 140), a first set of verified alerts based on the first updated configuration settings incorporating the first set of new alert rules. In some instances, alert optimization computing platform 110 may send such alerts to an alert portal, one or more specific network engineers, and/or other recipients and/or recipient devices instead of or in addition to sending such alerts to administrative computing device 140. In addition, alert optimization computing platform 110 may send such verified alerts based on the updated configuration settings, such that the alerts which are sent by alert optimization computing platform 110 represent only alerts that meet the newer and/or higher threshold(s) defined by the new alerts (e.g., and which do not merely meet only the requirements of the previous baseline configuration).

At step 210, alert optimization computing platform 110 may update alert status information. For example, at step 210, alert optimization computing platform 110 may update alert status information maintained in an alert optimization database (e.g., alert optimization database 114) based on the first updated configuration settings incorporating the first set of new alert rules. For instance, alert optimization computing platform 110 may update information maintained in alert optimization database 114 to include information specifying and/or identifying the new rules generated by alert optimization computing platform 110, the verified alerts that were sent by alert optimization computing platform 110, the recipients of such alerts, and/or other information.

By parsing and optimizing runtime infrastructure alerts (e.g., by implementing the techniques and/or performing the steps described above), alert optimization computing platform 110 may provide effective, efficient, scalable, and convenient technical solutions that address and overcome the technical problems associated with monitoring and managing computer networks. Subsequently, alert optimization computing platform 110 may iteratively execute one or more actions similar to those discussed above in processing additional alerts associated with server infrastructure 120 to continuously improve system performance, as illustrated in greater detail below.

At step 211, alert optimization computing platform 110 may receive one or more infrastructure alerts from server infrastructure 120 and/or server controller 130. For example, at step 211, alert optimization computing platform 110 may receive, via the communication interface (e.g., communication interface 116), from the server controller device (e.g., server controller 130) associated with server infrastructure (e.g., server infrastructure 120), second alert information identifying a second set of alerts associated with the server infrastructure (e.g., server infrastructure 120). For example, the second alert information identifying a second set of alerts associated with server infrastructure 120 may be received by alert optimization computing platform 110 from server controller 130, which may receive and/or gather alerts and/or other operational status information from server infrastructure 120, generate one or more alerts and/or additional alerts based on the alerts and/or other operational status information gathered from server infrastructure 120, and subsequently send the alert information identifying the gathered and/or generated alerts to alert optimization computing platform 110. As illustrated in greater detail below, alert optimization computing platform 110 may process the second alert information identifying the second set of alerts associated with server infrastructure 120 in accordance with the new alert rules generated by alert optimization computing platform 110 at step 207 and/or the updated configuration settings stored by alert optimization computing platform 110 at step 208.

In some embodiments, the second alert information identifying the second set of alerts associated with the server infrastructure may be aggregated by an aggregation layer provided by the server controller device associated with the server infrastructure. For example, the second alert information (which may, e.g., be received by alert optimization computing platform 110 from server controller 130) identifying the second set of alerts associated with the server infrastructure (e.g., server infrastructure 120) may be aggregated by an aggregation layer provided by the server controller device (e.g., server controller 130) associated with the server infrastructure (e.g., server infrastructure 120). For example, server controller 130 may store and/or execute instructions (e.g., in one or more of storage management module 132a, database management module 132b, network management module 132c, server management module 132d, server provisioning module 132e, security management module 132f, application management module 132g, and alerting and notification module 132h) that cause server controller 130 to provide an aggregation layer that receives, collects, and/or aggregates alerts and/or other operational status information from the servers included in server infrastructure 120.

In some embodiments, one or more alerts included in the second set of alerts associated with the server infrastructure may be generated by one or more servers included in the server infrastructure based on one or more detected deviations from one or more baseline conditions. For example, one or more alerts included in the second set of alerts associated with the server infrastructure (e.g., server infrastructure 120) may be generated by one or more servers included in the server infrastructure (e.g., server infrastructure 120) based on one or more detected deviations from one or more baseline conditions. Such deviations may be detected based on monitored conditions and/or measured parameters exceeding one or more thresholds that may be defined by logical statements, conditional statements, parameter ranges, and/or the like. In some instances, one or more alerts included in the second set of alerts associated with the server infrastructure (e.g., server infrastructure 120) may, for instance, be generated based on detected deviations from one or more thresholds that are defined by and/or otherwise associated with the baseline configuration defined by and/or received from administrative computing device 140.

At step 212, alert optimization computing platform 110 may pre-analyze the one or more infrastructure alerts received from server infrastructure 120 and/or server controller 130. For example, at step 212, alert optimization computing platform 110 may apply the pre-analyzer filter to the second alert information identifying the second set of alerts associated with the server infrastructure (e.g., server infrastructure 120) to obtain a second filtered set of alerts associated with the server infrastructure (e.g., server infrastructure 120). In applying the pre-analyzer filter to the second alert information identifying the second set of alerts associated with server infrastructure 120, alert optimization computing platform 110 may, for instance, filter the second set of alerts associated with server infrastructure 120 based on the first set of new alert rules generated by alert optimization computing platform 110 at step 207 and/or based on the first updated configuration settings stored by alert optimization computing platform 110 at step 208 to obtain the second filtered set of alerts associated with server infrastructure 120.

Figure 2D:
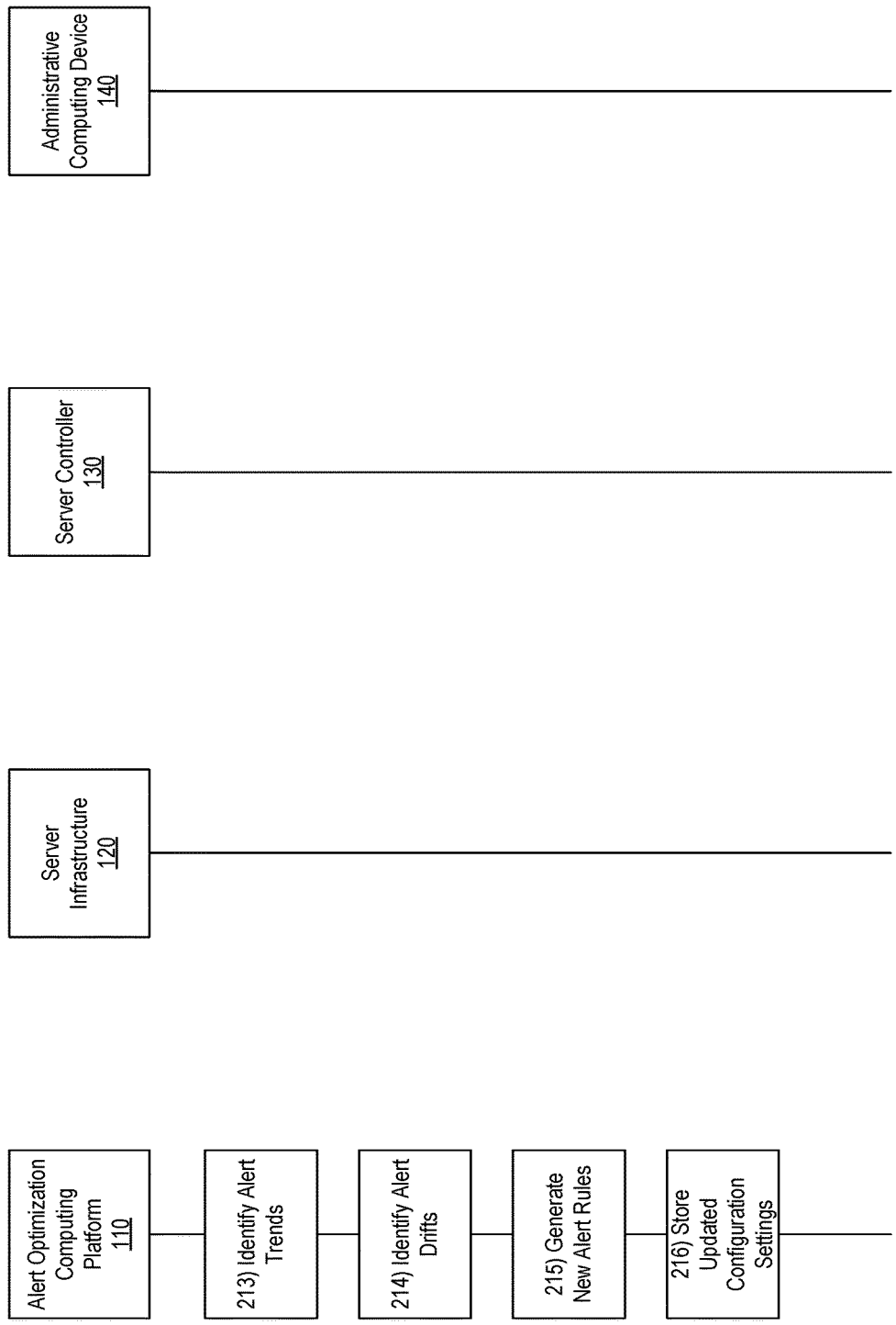

Referring to FIG. 2D, at step 213, alert optimization computing platform 110 may identify trends in the one or more infrastructure alerts received from server infrastructure 120 and/or server controller 130. For example, at step 213, alert optimization computing platform 110 may identify second alert trends associated with the server infrastructure (e.g., server infrastructure 120) based on the second filtered set of alerts associated with the server infrastructure (e.g., server infrastructure 120). In some embodiments, identifying the second alert trends associated with the server infrastructure based on the second filtered set of alerts associated with the server infrastructure may include classifying one or more alerts included in the second filtered set of alerts associated with the server infrastructure as genuine alerts or non-genuine alerts based on one or more classification parameters. For example, in identifying the second alert trends associated with the server infrastructure (e.g., server infrastructure 120) based on the second filtered set of alerts associated with the server infrastructure (e.g., server infrastructure 120), alert optimization computing platform 110 may classify one or more alerts included in the second filtered set of alerts associated with the server infrastructure (e.g., server infrastructure 120) as genuine alerts or non-genuine alerts based on one or more classification parameters. In some instances, the one or more classification parameters (which may, e.g., be used by alert optimization computing platform 110 in classifying alerts as genuine alerts or non-genuine alerts may be defined by and/or generated by alert optimization computing platform 110 based on the first set of new alert rules generated by alert optimization computing platform 110 at step 207 and/or based on the first updated configuration settings stored by alert optimization computing platform 110 at step 208.

At step 214, alert optimization computing platform 110 may identify drifts in the one or more infrastructure alerts received from server infrastructure 120 and/or server controller 130. For example, at step 214, alert optimization computing platform 110 may identify second alert drifts associated with a second set of applications hosted by the server infrastructure (e.g., server infrastructure 120) based on the second filtered set of alerts associated with the server infrastructure (e.g., server infrastructure 120). Such drifts may, for example, represent and/or correspond to groups or packets of alerts that are common across particular applications and/or the underlying environment and that might not be classifiable (e.g., when identifying alert trends, as discussed above) but might nevertheless be indicative of a unique pattern.

In some embodiments, identifying the second alert drifts associated with the second set of applications hosted by the server infrastructure based on the second filtered set of alerts associated with the server infrastructure may include identifying at least one alert drift that is specific to a particular application included in the second set of applications hosted by the server infrastructure. For example, in identifying the second alert drifts associated with the second set of applications hosted by the server infrastructure (e.g., server infrastructure 120) based on the second filtered set of alerts associated with the server infrastructure (e.g., server infrastructure 120), alert optimization computing platform 110 may identify at least one alert drift that is specific to a particular application included in the second set of applications hosted by the server infrastructure (e.g., server infrastructure 120).

At step 215, alert optimization computing platform 110 may generate new alert rules (e.g., based on the alert trends and/or the alert drifts). For example, at step 215, alert optimization computing platform 110 may generate a second set of new alert rules based on the second alert trends associated with the server infrastructure (e.g., server infrastructure 120) and the second alert drifts associated with the second set of applications hosted by the server infrastructure (e.g., server infrastructure 120).

In some embodiments, generating the second set of new alert rules based on the second alert trends associated with the server infrastructure and the second alert drifts associated with the second set of applications hosted by the server infrastructure may include generating at least one new alert defined as a logical statement. For example, in generating the second set of new alert rules based on the second alert trends associated with the server infrastructure (e.g., server infrastructure 120) and the second alert drifts associated with the second set of applications hosted by the server infrastructure (e.g., server infrastructure 120), alert optimization computing platform 110 may generate at least one new alert defined as a logical statement. In some instances, the logical statement may include a boolean equation that can be evaluated by alert optimization computing platform 110 based on conditions in server infrastructure 120 being monitored by alert optimization computing platform 110.

At step 216, alert optimization computing platform 110 may store updated configuration settings (e.g., based on the new alert rules generated by alert optimization computing platform 110). For example, at step 216, alert optimization computing platform 110 may store second updated configuration settings incorporating the second set of new alert rules generated (e.g., by alert optimization computing platform 110) based on the second alert trends associated with the server infrastructure (e.g., server infrastructure 120) and the second alert drifts associated with the second set of applications hosted by the server infrastructure (e.g., server infrastructure 120).

In some embodiments, storing the second updated configuration settings incorporating the second set of new alert rules generated based on the second alert trends associated with the server infrastructure and the second alert drifts associated with the second set of applications hosted by the server infrastructure may include modifying one or more configuration settings used by the pre-analyzer filter. For example, in storing the second updated configuration settings incorporating the second set of new alert rules generated based on the second alert trends associated with the server infrastructure (e.g., server infrastructure 120) and the second alert drifts associated with the second set of applications hosted by the server infrastructure (e.g., server infrastructure 120), alert optimization computing platform 110 may modify one or more configuration settings used by the pre-analyzer filter. For instance, alert optimization computing platform 110 may modify one or more configuration settings used by the pre-analyzer filter to control and/or otherwise cause the pre-analyzer filter to apply and/or otherwise use the new alert rules generated by alert optimization computing platform 110 when filtering and/or otherwise processing subsequent alerts in the future.

Figure 2E:
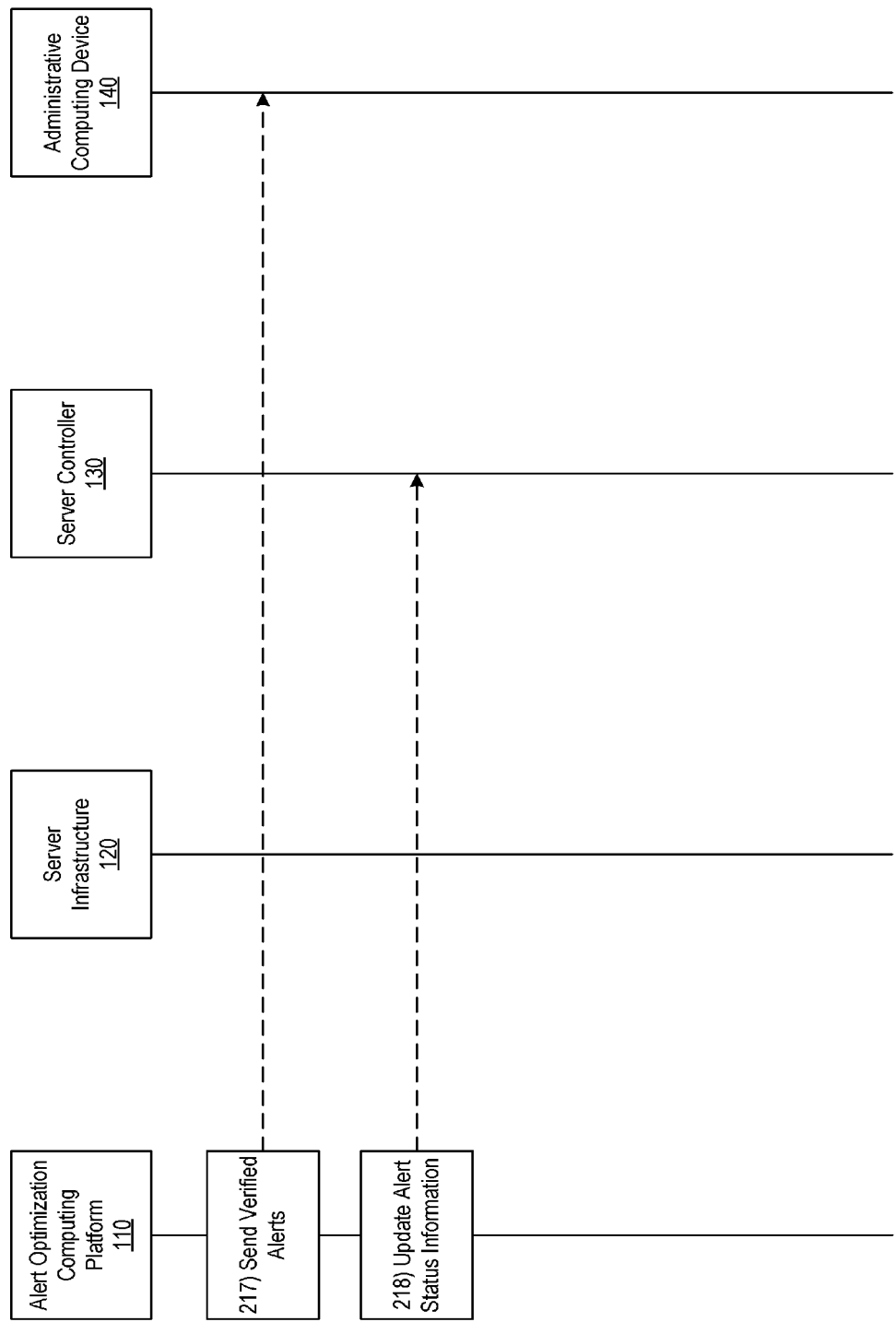

Referring to FIG. 2E, at step 217, alert optimization computing platform 110 may send one or more verified alerts to administrative computing device 140. For example, at step 217, alert optimization computing platform 110 may send, via the communication interface (e.g., communication interface 116), to the administrative computing device (e.g., administrative computing device 140), a second set of verified alerts based on the second updated configuration settings incorporating the second set of new alert rules. In some instances, alert optimization computing platform 110 may send such alerts to an alert portal, one or more specific network engineers, and/or other recipients and/or recipient devices instead of or in addition to sending such alerts to administrative computing device 140. In addition, alert optimization computing platform 110 may send such verified alerts based on the updated configuration settings, such that the alerts which are sent by alert optimization computing platform 110 represent only alerts that meet the newer and/or higher threshold(s) defined by the new alerts (e.g., and which do not merely meet only the requirements of the previous configuration).

Figure 4:
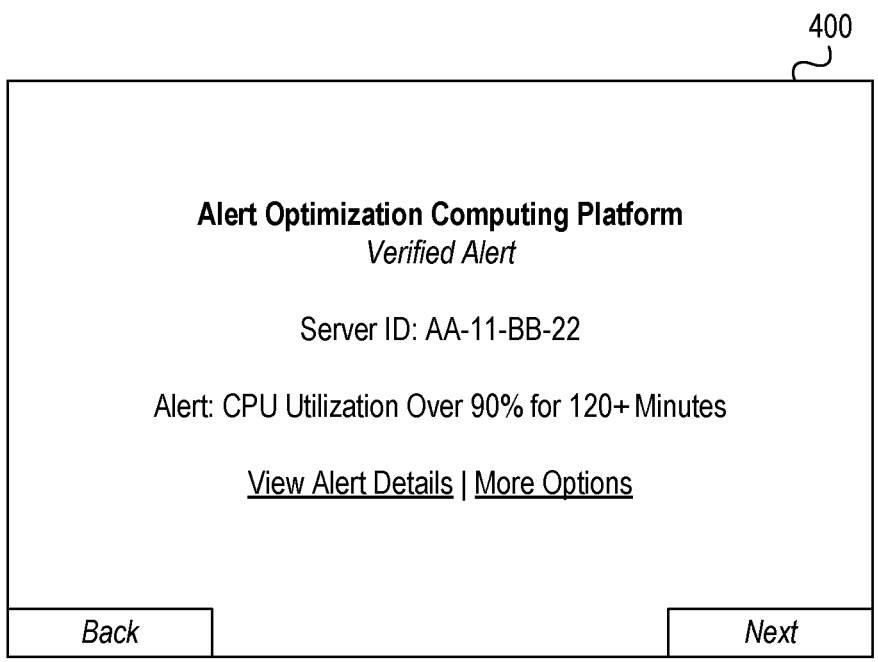

In sending one or more verified alerts to administrative computing device 140 (e.g., at step 217), alert optimization computing platform 110 may cause administrative computing device 140 to display and/or otherwise present a graphical user interface similar to graphical user interface 400, which is illustrated in FIG. 4. As seen in FIG. 4, graphical user interface 400 may include one or more fields, controls, and/or other elements that may allow a user of administrative computing device 140 to view information associated with and/or otherwise interact with one or more verified alerts associated with one or more servers included in server infrastructure 120. For example, graphical user interface 400 may include one or more fields, controls, and/or other elements that may allow a user of administrative computing device 140 to view a server identifier associated with a particular alert, view alert information associated with the particular alert (e.g., "CPU Utilization Over 90% for 120+ Minutes"), and access alert details and/or additional options. In addition, graphical user interface 400 may include one or more user interface elements that, when invoked by a user of administrative computing device 140, direct and/or cause administrative computing device 140 to respond to and/or resolve a particular alert and/or update status information associated with a particular alert.

At step 218, alert optimization computing platform 110 may update alert status information. For example, at step 218, alert optimization computing platform 110 may update alert status information maintained in the alert optimization database (e.g., alert optimization database 114) based on the second updated configuration settings incorporating the second set of new alert rules. For instance, alert optimization computing platform 110 may update information maintained in alert optimization database 114 to include information specifying and/or identifying the new rules generated by alert optimization computing platform 110, the verified alerts that were sent by alert optimization computing platform 110, the recipients of such alerts, and/or other information. Subsequently, alert optimization computing platform 110 may iteratively execute one or more actions similar to those discussed above in processing additional alerts associated with server infrastructure 120 to continuously improve system performance.

Figure 5:
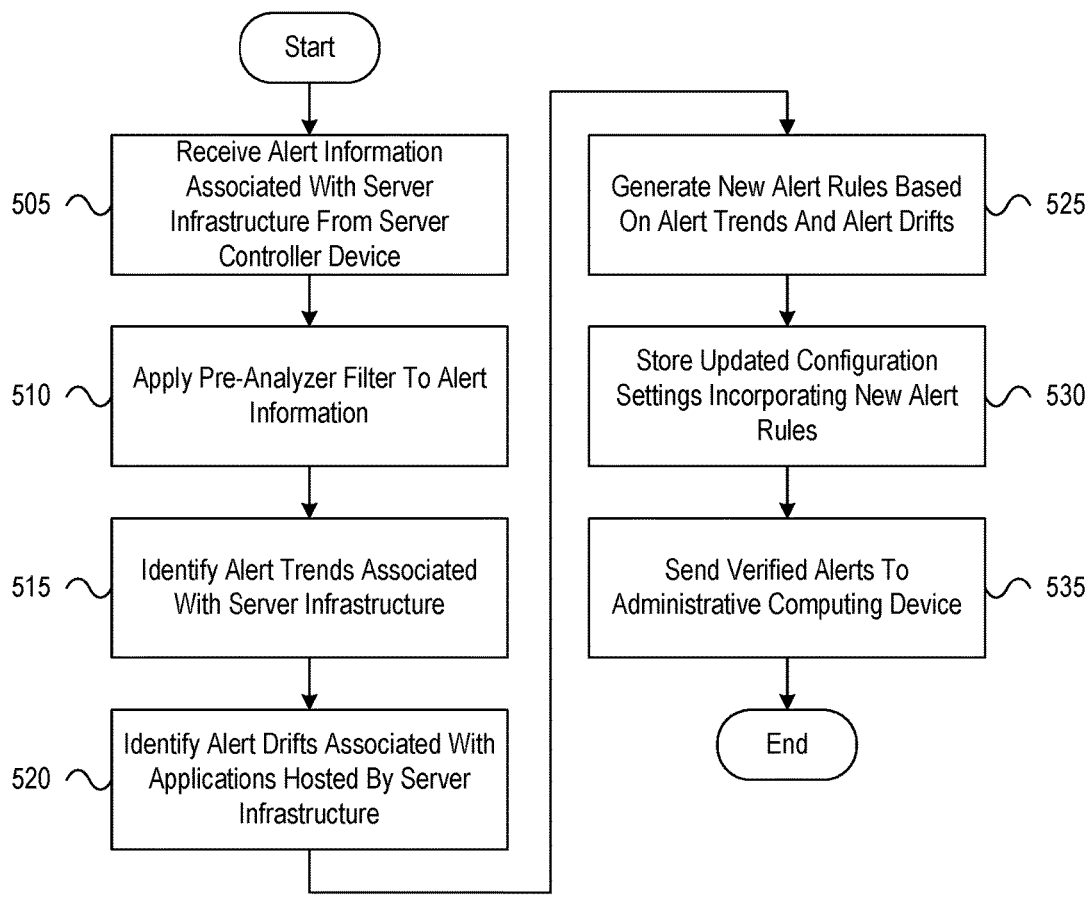
FIG. 5 depicts an illustrative method for monitoring and managing computer networks by parsing and optimizing runtime infrastructure alerts in accordance with one or more example embodiments.

FIG. 5 depicts an illustrative method for monitoring and managing computer networks by parsing and optimizing runtime infrastructure alerts in accordance with one or more example embodiments. Referring to FIG. 5, at step 505, a computing platform having at least one processor, a memory, and a communication interface may receive, via the communication interface, from a server controller device associated with server infrastructure, first alert information identifying a first set of alerts associated with the server infrastructure. At step 510, the computing platform may apply a pre-analyzer filter to the first alert information identifying the first set of alerts associated with the server infrastructure to obtain a first filtered set of alerts associated with the server infrastructure. At step 515, the computing platform may identify first alert trends associated with the server infrastructure based on the first filtered set of alerts associated with the server infrastructure. At step 520, the computing platform may identify first alert drifts associated with a first set of applications hosted by the server infrastructure based on the first filtered set of alerts associated with the server infrastructure. At step 525, the computing platform may generate a first set of new alert rules based on the first alert trends associated with the server infrastructure and the first alert drifts associated with the first set of applications hosted by the server infrastructure. At step 530, the computing platform may store first updated configuration settings incorporating the first set of new alert rules generated based on the first alert trends associated with the server infrastructure and the first alert drifts associated with the first set of applications hosted by the server infrastructure. At step 535, the computing platform may send, via the communication interface, to an administrative computing device, a first set of verified alerts based on the first updated configuration settings incorporating the first set of new alert rules.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
        receive, via the communication interface, from a server controller device associated with server infrastructure, first alert information identifying a first set of alerts associated with the server infrastructure;
        apply a pre-analyzer filter to the first alert information identifying the first set of alerts associated with the server infrastructure to obtain a first filtered set of alerts associated with the server infrastructure;
        identify first alert trends associated with the server infrastructure based on the first filtered set of alerts associated with the server infrastructure;
        identify first alert drifts associated with a first set of applications hosted by the server infrastructure based on the first filtered set of alerts associated with the server infrastructure;
        generate a first set of new alert rules based on the first alert trends associated with the server infrastructure and the first alert drifts associated with the first set of applications hosted by the server infrastructure;
        store first updated configuration settings incorporating the first set of new alert rules generated based on the first alert trends associated with the server infrastructure and the first alert drifts associated with the first set of applications hosted by the server infrastructure; and
        send, via the communication interface, to an administrative computing device, a first set of verified alerts based on the first updated configuration settings incorporating the first set of new alert rules.

2. The computing platform of claim 1, wherein the memory stores additional computer-readable instructions that, when executed by the at least one processor, cause the computing platform to:
    prior to receiving the first alert information identifying the first set of alerts associated with the server infrastructure:
        receive, via the communication interface, from the administrative computing device, one or more baseline configuration commands; and
        store configuration information based on receiving the one or more baseline configuration commands from the administrative computing device.

3. The computing platform of claim 1, wherein the first alert information identifying the first set of alerts associated with the server infrastructure is aggregated by an aggregation layer provided by the server controller device associated with the server infrastructure.

4. The computing platform of claim 1, wherein one or more alerts included in the first set of alerts associated with the server infrastructure are generated by one or more servers included in the server infrastructure based on one or more detected deviations from one or more baseline conditions.

5. The computing platform of claim 1, wherein identifying the first alert trends associated with the server infrastructure based on the first filtered set of alerts associated with the server infrastructure comprises classifying one or more alerts included in the first filtered set of alerts associated with the server infrastructure as genuine alerts or non-genuine alerts based on one or more classification parameters.

6. The computing platform of claim 1, wherein identifying the first alert drifts associated with the first set of applications hosted by the server infrastructure based on the first filtered set of alerts associated with the server infrastructure comprises identifying at least one alert drift that is specific to a particular application included in the first set of applications hosted by the server infrastructure.

7. The computing platform of claim 1, wherein generating the first set of new alert rules based on the first alert trends associated with the server infrastructure and the first alert drifts associated with the first set of applications hosted by the server infrastructure comprises generating at least one new alert defined as a logical statement.

8. The computing platform of claim 1, wherein storing the first updated configuration settings incorporating the first set of new alert rules generated based on the first alert trends associated with the server infrastructure and the first alert drifts associated with the first set of applications hosted by the server infrastructure comprises modifying one or more baseline configuration settings used by the pre-analyzer filter.

9. The computing platform of claim 1, wherein the memory stores additional computer-readable instructions that, when executed by the at least one processor, cause the computing platform to:
update alert status information maintained in an alert optimization database based on the first updated configuration settings incorporating the first set of new alert rules.

10. The computing platform of claim 1, wherein the memory stores additional computer-readable instructions that, when executed by the at least one processor, cause the computing platform to:
receive, via the communication interface, from the server controller device associated with the server infrastructure, second alert information identifying a second set of alerts associated with the server infrastructure;
apply the pre-analyzer filter to the second alert information identifying the second set of alerts associated with the server infrastructure to obtain a second filtered set of alerts associated with the server infrastructure;
identify second alert trends associated with the server infrastructure based on the second filtered set of alerts associated with the server infrastructure;
identify second alert drifts associated with a second set of applications hosted by the server infrastructure based on the second filtered set of alerts associated with the server infrastructure;
generate a second set of new alert rules based on the second alert trends associated with the server infrastructure and the second alert drifts associated with the second set of applications hosted by the server infrastructure;
store second updated configuration settings incorporating the second set of new alert rules generated based on the second alert trends associated with the server infrastructure and the second alert drifts associated with the second set of applications hosted by the server infrastructure; and
send, via the communication interface, to the administrative computing device, a second set of verified alerts based on the second updated configuration settings incorporating the second set of new alert rules.

11. The computing platform of claim 10, wherein the second alert information identifying the second set of alerts associated with the server infrastructure is aggregated by an aggregation layer provided by the server controller device associated with the server infrastructure.

12. The computing platform of claim 10, wherein one or more alerts included in the second set of alerts associated with the server infrastructure are generated by one or more servers included in the server infrastructure based on one or more detected deviations from one or more baseline conditions.

13. The computing platform of claim 10, wherein identifying the second alert trends associated with the server infrastructure based on the second filtered set of alerts associated with the server infrastructure comprises classifying one or more alerts included in the second filtered set of alerts associated with the server infrastructure as genuine alerts or non-genuine alerts based on one or more classification parameters.

14. The computing platform of claim 10, wherein identifying the second alert drifts associated with the second set of applications hosted by the server infrastructure based on the second filtered set of alerts associated with the server infrastructure comprises identifying at least one alert drift that is specific to a particular application included in the second set of applications hosted by the server infrastructure.

15. The computing platform of claim 10, wherein generating the second set of new alert rules based on the second alert trends associated with the server infrastructure and the second alert drifts associated with the second set of applications hosted by the server infrastructure comprises generating at least one new alert defined as a logical statement.

16. The computing platform of claim 10, wherein storing the second updated configuration settings incorporating the second set of new alert rules generated based on the second alert trends associated with the server infrastructure and the second alert drifts associated with the second set of applications hosted by the server infrastructure comprises modifying one or more baseline configuration settings used by the pre-analyzer filter.

17. The computing platform of claim 10, wherein the memory stores additional computer-readable instructions that, when executed by the at least one processor, cause the computing platform to:
update alert status information maintained in an alert optimization database based on the second updated configuration settings incorporating the second set of new alert rules.

18. A method, comprising:
at a computing platform comprising at least one processor, memory, and a communication interface:
receiving, by the at least one processor, via the communication interface, from a server controller device associated with server infrastructure, first alert information identifying a first set of alerts associated with the server infrastructure;
applying, by the at least one processor, a pre-analyzer filter to the first alert information identifying the first set of alerts associated with the server infrastructure to obtain a first filtered set of alerts associated with the server infrastructure;

identifying, by the at least one processor, first alert trends associated with the server infrastructure based on the first filtered set of alerts associated with the server infrastructure;

identifying, by the at least one processor, first alert drifts associated with a first set of applications hosted by the server infrastructure based on the first filtered set of alerts associated with the server infrastructure;

generating, by the at least one processor, a first set of new alert rules based on the first alert trends associated with the server infrastructure and the first alert drifts associated with the first set of applications hosted by the server infrastructure;

storing, by the at least one processor, first updated configuration settings incorporating the first set of new alert rules generated based on the first alert trends associated with the server infrastructure and the first alert drifts associated with the first set of applications hosted by the server infrastructure; and sending, by the at least one processor, via the communication interface, to an administrative computing device, a first set of verified alerts based on the first updated configuration settings incorporating the first set of new alert rules.

19. The method of claim 18, comprising:

prior to receiving the first alert information identifying the first set of alerts associated with the server infrastructure:

receiving, by the at least one processor, via the communication interface, from the administrative computing device, one or more baseline configuration commands; and storing, by the at least one processor, configuration information based on receiving the one or more baseline configuration commands from the administrative computing device.

20. One or more non-transitory computer-readable media storing instructions that, when executed by a computing platform comprising at least one processor, memory, and a communication interface, cause the computing platform to:

receive, via the communication interface, from a server controller device associated with server infrastructure, first alert information identifying a first set of alerts associated with the server infrastructure;

apply a pre-analyzer filter to the first alert information identifying the first set of alerts associated with the server infrastructure to obtain a first filtered set of alerts associated with the server infrastructure;

identify first alert trends associated with the server infrastructure based on the first filtered set of alerts associated with the server infrastructure;

identify first alert drifts associated with a first set of applications hosted by the server infrastructure based on the first filtered set of alerts associated with the server infrastructure;

generate a first set of new alert rules based on the first alert trends associated with the server infrastructure and the first alert drifts associated with the first set of applications hosted by the server infrastructure;

store first updated configuration settings incorporating the first set of new alert rules generated based on the first alert trends associated with the server infrastructure and the first alert drifts associated with the first set of applications hosted by the server infrastructure; and send, via the communication interface, to an administrative computing device, a first set of verified alerts based on the first updated configuration settings incorporating the first set of new alert rules.

\* \* \* \* \*